United States Patent [19]

Nagata et al.

[11] Patent Number: 4,592,937
[45] Date of Patent: Jun. 3, 1986

[54] ARCUATE SIDE MOLDING

[75] Inventors: Takuji Nagata, Nishikasugai; Isao Itou, Nagoya, both of Japan

[73] Assignee: Toyoda Gosei Co., Ltd., Nishikasugai, Japan

[21] Appl. No.: 768,152

[22] Filed: Aug. 22, 1985

[30] Foreign Application Priority Data

Aug. 28, 1984 [JP] Japan ............ 59-131012[U]

[51] Int. Cl.$^4$ ............................................. B60R 13/02
[52] U.S. Cl. ................................................ 428/31; 293/1; 293/128; 293/155; 293/120; 296/207; 428/189
[58] Field of Search ............... 428/31, 189; 293/128, 293/126, 1, 120, 155; 296/207; 52/573

[56] References Cited

U.S. PATENT DOCUMENTS 4,364,591 12/1982 Bien ........................... 293/128
4,529,244 7/1985 Zaydel ........................ 296/146

Primary Examiner—Paul J. Thibodeau
Attorney, Agent, or Firm—Cushman, Darby & Cushman

[57] ABSTRACT

An arcuate side molding to be attached to a curved surface of an automobile body avoiding holes being formed therein. The arcuate side molding comprises a resin plate having projections formed in the backside thereof, and an intermediate member provided with slots for receiving the projections of the resin plate. In assembling the resin plate and the intermediate member, the projections are inserted through the slots of intermediate member, and then the tips of the projections are heat caulked to join the intermediate member to the resin plate so that the resin plate is slidable relative to the intermediate member and the resin plate will not be separated from the resin plate.

2 Claims, 8 Drawing Figures

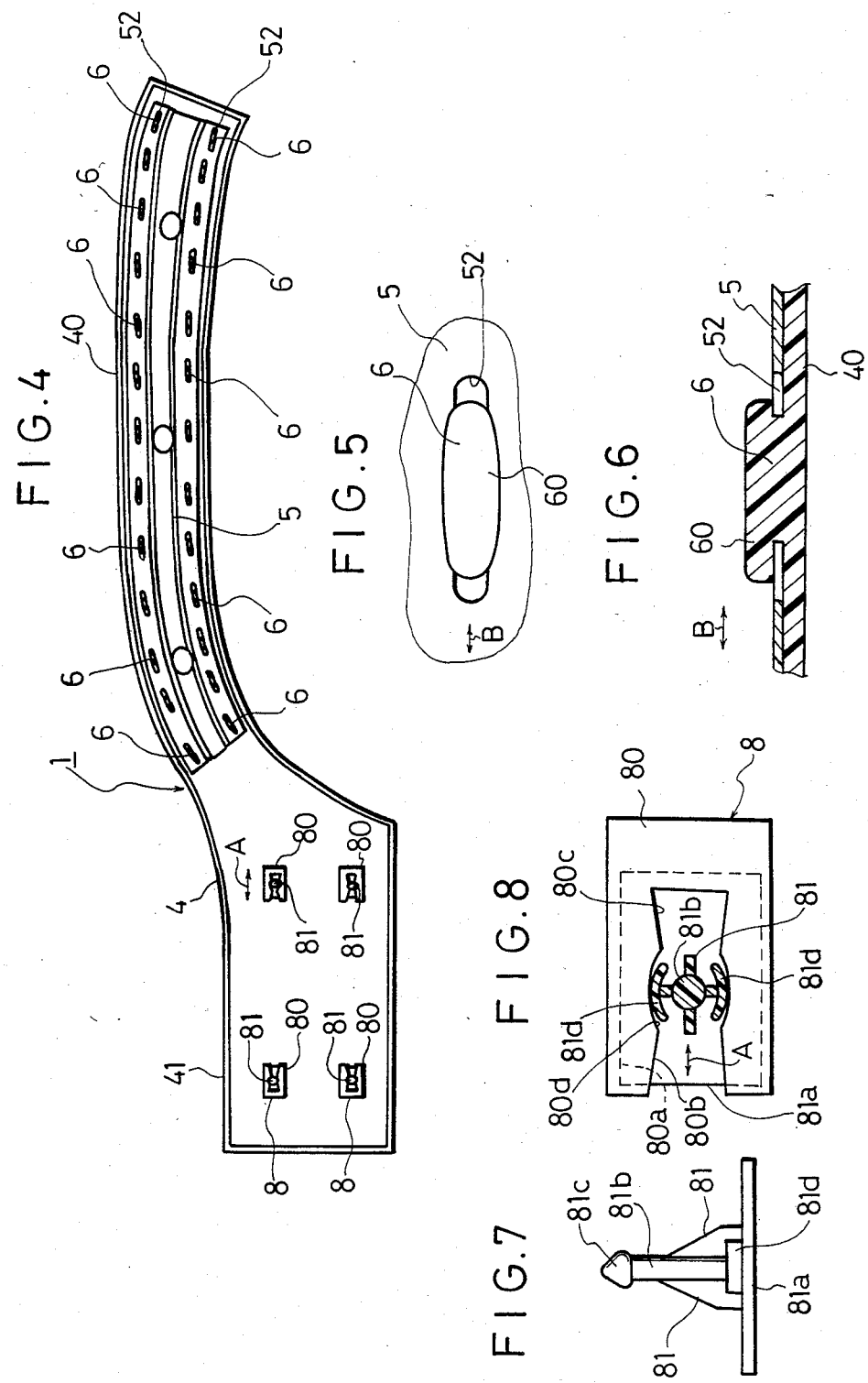

ARCUATE SIDE MOLDING

BACKGROUND OF THE INVENTION

1. Field of the Invention

The present invention relates to an arcuate side molding which is capable of being attached to an arcuate portion of an automobile body such as a tire housing of an automobile body.

2. Description of the Prior Art

It has hitherto been difficult to attach a side molding to an arcuate portion of an automobile body such as a tire housing. No hole has been formed in such a portion because it is difficult to form holes in an arcuate portion of an automobile body in the pressing process of manufacturing and a tire housing is liable to be corroded if any hole is formed therein. Accordingly, it has been usual merely to attach a small side molding directly to an automobile body with an adhesive tape. The thermal expansion coefficient of the side molding is different from that of the automobile body. Therefore, the direct attachment of the side molding to the automobile body has easily caused thermal deformation to the side molding relative to the automobile body, for example, in a hot day in summer.

SUMMARY OF THE INVENTION

Accordingly, the present invention has been made to solve these problems in the conventional side molding, and it is an object of the present invention to provide an arcuate side molding which can be easily attached to an arcuate portion of an automobile body in a manner of being capable of absorbing thermal deformation of the side molding.

An arcuate side molding of the present invention comprises: a resin plate composed of a first molding portion which has a strip shape corresponding to an arcuate portion of an automobile body and a second molding portion which has a larger width than that of the first molding portion and is extended from one end of the first molding portion, a plurality of engaging projections being formed on the backside at least of the first molding portion and; an intermediate member made of metal having an adhesive surface for at least partially adhering to the automobile body and slots which are formed in the positions corresponding to the engaging projections of the first molding portion, the longitudinal direction of which is approximately parallel to that of the first molding portion, wherein the engaging projections formed on the first molding portion of the resin plate are engaged in the slots of the intermediate member in a way that the resin plate and the intermediate member are longitudinally slidable to each other.

DETAILED DESCRIPTION OF THE INVENTION

An arcuate resin plate employed in the present invention comprises a first molding portion and a second molding portion extended from one end of the first molding portion. The second molding portion may be extended from both ends of the first molding portion. The first molding portion has a strip shape corresponding to an arcuate portion such as a tire housing of an automobile body. Accordingly, the lower part of the first molding portion forms an arc shape. A plurality of projections for engaging the resin plate to the automobile body are formed on the backside of the first molding portion, and may also be formed on the backside of the second molding portion. The resin plate is formed by injection molding an optional resin such as vinyl chloride and polypropylene. An intermediate member is attached to the backside of the resin plate. Generally, a sheet steel which is press formed to conform with the automobile body is employed as an intermediate member. The intermediate member has an adhesive surface for adhering to the outer surface of the automobile body. The intermediate member has a plurality of slots in a manner that the longitudinal direction of the slots is approximately parallel to that of the first molding portion. The engagement of the intermediate member with the the resin plate is achieved by inserting the engaging projections formed on the backside of the resin plate into the slots in the intermediate member and then heating the tips of the projections to be pressed and make thick heads (heat caulking), or by forcibly inserting the projections with thick heads into the slots which are narrower than the thick heads of the projections by use of the elasticity of the projections. The intermediate member is disposed at least on the first molding portion of the resin plate. It is preferable to form slidable projections on the backside of the second molding portion of the resin plate. The slidable projections on the second molding portion are to be inserted into and engaged with holes in the automobile body so as to be slidable in the longitudinal direction of the second molding portion.

The arcuate side molding of the present invention can be attached to the automobile body by means of an adhesive tape and the like stuck to one surface of the intermediate member. In the present invention, the intermediate member is slidably attached to the backside of the resin plate. Therefore, the slidablity of the engagement can absorb the thermal deformation due to the difference of thermal expansion coefficient of the automobile body and the resin plate.

BRIEF DESCRIPTION OF THE DRAWINGS

The above and other objects, features and advantages of the present invention will become apparent from the following description of a preferred embodiment thereof taken in connection with the accompanying drawings in which:

FIG. 4 is a plan view of the backside of the arcuate side molding of FIG. 1;

FIG. 5 is a plan view of projections formed in a first molding portion by means of heat caulking;

FIG. 6 is a cross-sectional view of the projections shown in FIG. 5;

FIG. 7 is a side view of a mounting member with projections; and

FIG. 8 is a plan view of the mounting member with projections.

DESCRIPTION OF THE PREFERRED EMBODIMENT

Figure 1:
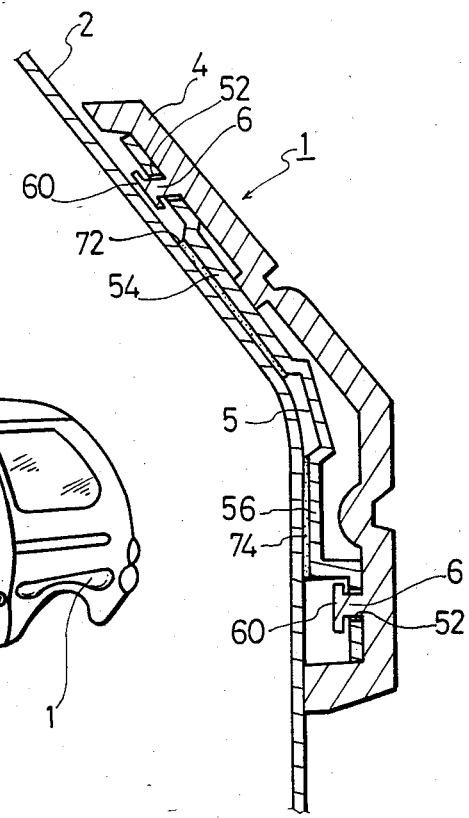
FIG. 1 is a sectional view illustrating the constitution of an arcuate side molding in a preferred embodiment according to the present invention.
Figure 2:
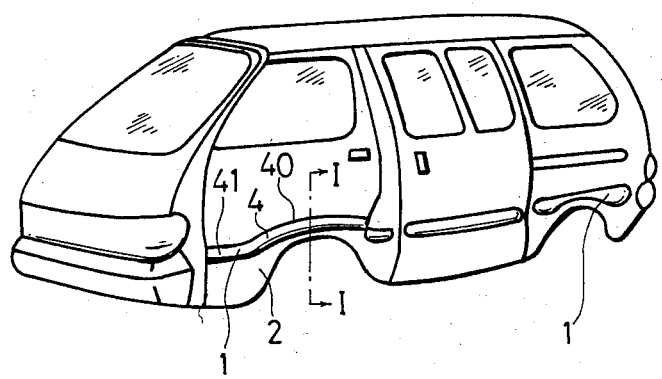
FIG. 2 is a perspective view of an automobile body showing arcuate side moldings of the present invention as attached to the automobile body.
Figure 3:
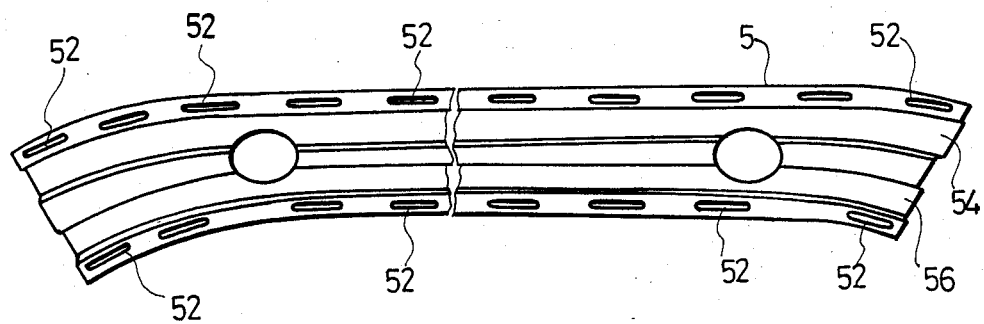
FIG. 3 is a plan view of an intermediate member employed in the arcuate side molding of FIG. 1.

The present invention will be described in detail hereinafter with reference to a preferred embodiment thereof. FIG. 1 is a sectional view of an arcuate side molding 1 in a preferred embodiment according to the present invention, illustrating the constitution thereof. FIG. 2 is a perspective view of an automobile body showing arcuate side moldings 1 of the present invention as attached to the automobile body 2. A resin plate 4 is formed by injection molding polypropylene resin. The resin plate 4 comprises a first molding portion 40 and a second molding portion 41. The lower side of the first molding portion 40 forms an arc shape. A plurality of projections 6 are formed on the backside of the first molding portion 40 of the resin plate 4. An intermediate member 5, which is made of a sheet steel, has a plurality of slots 52, as shown in FIG. 3. The longitudinal direction of the slots 52 is approximately parallel to the longitudinal direction of the first molding portion 40. As shown in FIG. 1, the intermediate member 5 is bent to conform with an automobile body 2. The intermediate member 5 has two projected tracks the top surfaces of which form adhesive surfaces 54 and 56 for adhering to the outer surface of the automobile body 2. The intermediate member 5 is attached to the backside of the resin plate 4 by inserting the engaging projections 6 formed on the backside of the resin plate 4 into the slots 52 of the intermediate member 5 and then heating and pressing the tips of the projections 6 so as to deform and make thick heads 60. Thereby, the intermediate member 5 is not easily separated from the resin plate 4. FIGS. 5 and 6 show the heads 60 of the projections 6 deformed by heat caulking. In the caulked state, when a load such as thermal stress is applied to the arcuate side molding 1 according to the present embodiment, the intermediate member 5 and the resin plate 4 are slidable to each other in the longitudinal direction, i.e., the direction of arrow B of FIG. 6.

Slidable projections 8 are formed in the backside of the second molding 41 of the resin plate 4. As shown in FIGS. 7 and 8, a slidable projection 8 comprises a holding member 80 which is formed on the backside of the second molding portion 41 and a mounting member 81 made of resin. The mounting member 81 further comprises a plate portion 81a, a shaft portion 81b perpendicularly installed on the plate portion 81a, a head portion 81c formed on the end of the shaft portion 81b, and arm portions 81d which are formed on the shaft portion 81b. The holding member 80 has a slit 80a to which the plate portion 81a of the mounting member 81 is inserted. The holding member 80 constituting the slit 80a includes taper portions 80b and 80c and arcuate portion 80d. The insertion of the plate portion 81a of the mounting member 81 to the slit 80a of the holding member 80 enables the sliding movement of the mounting member 81 in the direction of arrow A in FIGS. 4 and 8, i.e., the longitudinal direction of the second molding portion 41.

Next, the attachment of the arcuate side molding 1 to an automobile body is explained hereinafter. The adhesive surfaces 54 and 56 of the intermediate member 5 are attached to the outer surface of the automobile body 2 by means of adhesive tapes 72 and 74. At the same time, the head portions 81c of the projections 8 are inserted into the holes in the automobile body 2, thereby attaching the second molding portion 41 to the automobile body 2, as shown in FIG. 1.

As apparent from the foregoing description, the arcuate side molding according to the present invention is constructed by slidably attaching a resin plate having a first molding portion which conforms with the arcuate portion of the automobile body to the intermediate member having approximately the same shape as that of the resin plate. Accordingly, the arcuate side molding can be easily and simply attached to the automobile body by adhesively fixing the intermediate member to the automobile body by means of adhesive tapes or the like. When the resin plate is made of polypropylene resin, adhesives and adhesive tapes are unable to attach the resin plate directly to the automobile body. Therefore, the arcuate side molding of the present invention is particularly effective when the resin plate of the present invention is made of polypropylene resin. Also, since the resin plate is slidable relative to the intermediate member, the thermal deformation attributable to the difference between the resin plate and the intermediate member can be obviated.

Although the invention has been described in its preferred form with a certain degree of particularity, obviously many modifications and variations of the present invention are possible in the light of the above teachings. It is therefore to be understood that the present invention may be practiced otherwise than as specifically described without departing from the spirit or scope of the appended claims.

What is claimed is:

1. An arcuate side molding comprises:
    a resin plate composed of:
    a first molding portion which has a strip shape corresponding to an arcuate portion of an automobile body;
    a second molding portion which has a larger width than that of said first molding portion,
    a plurality of engaging projections being formed on the backside at least of said first molding portion; and
    an intermediate member made of metal having an adhesive surface for at least partially adhering to said automobile body and slots which are formed in positions corresponding to said engaging projections of first molding portion, the longitudinal direction of which is appoximately parallel to that of said first molding portion,
    wherein said engaging projections formed on said first molding portion of said resin plate are engaged in said slots of said intermediate member in a manner that said resin plate and said intermediate member are longitudinally slidable to each other.

2. An arcuate side molding according to claim 1, wherein said second molding portion of said resin plate has slidable projections which are slidable in the longitudinal direction of said second molding portion on the backside thereof and inserted into holes in the outer surface of said automobile body.

* * * * *